United States Patent
Frohlund et al.

(10) Patent No.: US 10,432,832 B2
(45) Date of Patent: Oct. 1, 2019

(54) ALIGNMENT MEMBER AND A METHOD FOR ALIGNING A SENSOR BOARD

(71) Applicant: AXIS AB, Lund (SE)

(72) Inventors: Stig Frohlund, Lund (SE); Andreas Karlsson Jägerman, Lund (SE)

(73) Assignee: Axis AB, Lund (SE)

( * ) Notice: Subject to any disclaimer, the term of this patent is extended or adjusted under 35 U.S.C. 154(b) by 43 days.

(21) Appl. No.: 15/849,124

(22) Filed: Dec. 20, 2017

(65) Prior Publication Data

US 2018/0176428 A1 Jun. 21, 2018

(30) Foreign Application Priority Data

Dec. 20, 2016 (EP) .................... 16205246

(51) Int. Cl.
  H04N 5/225 (2006.01)
  G01B 11/27 (2006.01)
  H04N 5/238 (2006.01)

(52) U.S. Cl.
  CPC ........... H04N 5/2253 (2013.01); G01B 11/27 (2013.01); H04N 5/238 (2013.01)

(58) Field of Classification Search
  CPC ....... H04N 5/2253; H04N 5/238; G01B 11/27
  See application file for complete search history.

(56) References Cited

U.S. PATENT DOCUMENTS

| | | | |
|---|---|---|---|
| 2004/0069998 A1* | 4/2004 | Harazono | ......... H01L 27/14618 257/81 |
| 2004/0109079 A1 | 6/2004 | Fujimoto et al. | |
| 2004/0251509 A1* | 12/2004 | Choi | ................. H01L 27/14618 257/432 |
| 2008/0211045 A1 | 9/2008 | Ono | |
| 2009/0079863 A1 | 3/2009 | Aoki et al. | |
| 2012/0133825 A1 | 5/2012 | Nakajima et al. | |

(Continued)

FOREIGN PATENT DOCUMENTS

| | | |
|---|---|---|
| CN | 102681131 A | 9/2012 |
| DE | 9208024 U1 | 9/1992 |

(Continued)

OTHER PUBLICATIONS

Chinese Office Action dated Jan. 9, 2019 for the Chinese Patent Application No. 201711346265.7.

(Continued)

*Primary Examiner* — Shahbaz Nazrul

(74) *Attorney, Agent, or Firm* — Volpe and Koenig, P.C.

(57) ABSTRACT

An alignment member for alignment of a sensor board relative an optics unit where the alignment member is arranged to couple the sensor board to the optics unit. The alignment member comprises: a section formed by a thermoplastic material and arranged to support the sensor board; and a heating element which upon activation is arranged to transfer heat to the section such that the section at least partly is heated to a temperature being at least the glass transition temperature for the thermoplastic material for enabling alignment of the sensor board relative the optics unit. A camera arrangement comprises a sensor board, an optics unit, and an alignment member. A method for aligning a sensor board relative an optics unit.

15 Claims, 5 Drawing Sheets

(56) References Cited

U.S. PATENT DOCUMENTS

| | | | |
|---|---|---|---|
| 2014/0375876 A1* | 12/2014 | Ikemoto | H05K 1/182 348/373 |
| 2015/0070577 A1* | 3/2015 | Ikemoto | H04N 5/2253 348/374 |

FOREIGN PATENT DOCUMENTS

| | | | | |
|---|---|---|---|---|
| EP | 2 372 426 A1 | | 10/2011 | |
| EP | 2372426 A1 | * | 10/2011 | G02B 7/003 |
| EP | 2 272 701 A1 | | 10/2012 | |
| EP | 2722701 A1 | * | 4/2014 | G02B 7/003 |
| EP | 2722701 A1 | | 4/2014 | |
| JP | 2004146946 A2 | | 5/2004 | |
| JP | 2005-227620 A | | 8/2005 | |
| JP | 2005227620 A | | 8/2005 | |
| JP | 2011-066560 A | | 3/2011 | |
| WO | 00/48172 A2 | | 8/2000 | |
| WO | 2004/010686 A1 | | 1/2004 | |

OTHER PUBLICATIONS

Korean Office Action dated Dec. 3, 2018 for the Korean Patent Application No. 10-2017-0169500.
Uppdragshuset (Jun. 10, 2016) Plastic Alignment novelty search.
EP 16205246.8 European Search Report (dated Mar. 8, 2017).

\* cited by examiner

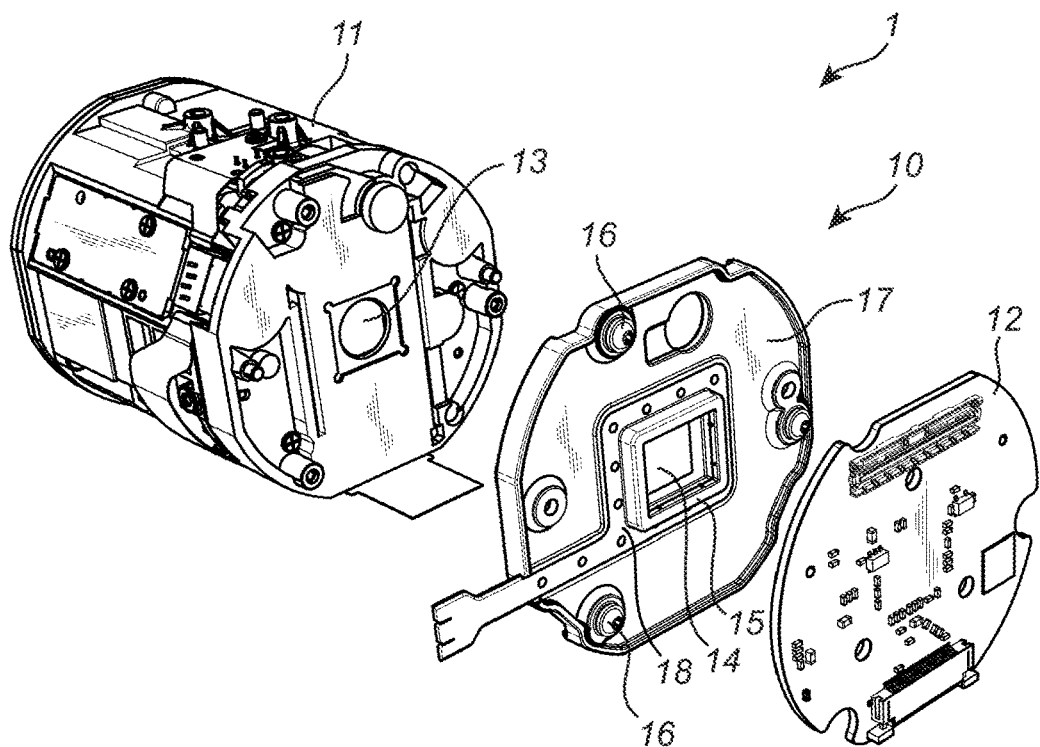
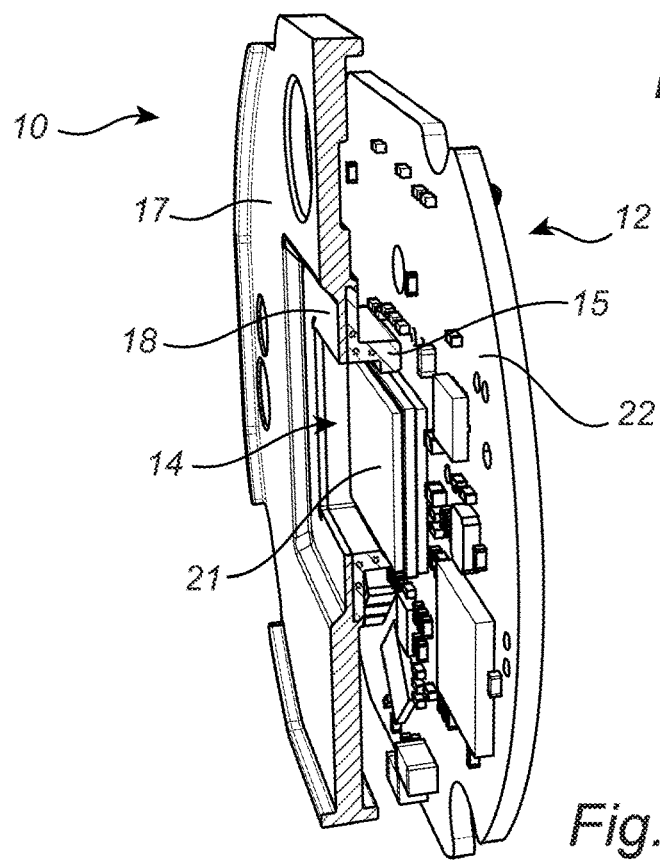
Fig. 1
Fig. 2

ALIGNMENT MEMBER AND A METHOD FOR ALIGNING A SENSOR BOARD

FIELD OF INVENTION

The present teachings relate to an alignment member for alignment of a sensor board relative an optics unit, and to a camera arrangement comprising such an alignment member. The present teachings further relate to a method for aligning a sensor board relative an optics unit.

BACKGROUND

Cameras, for example monitoring cameras, are used in many different applications, both indoors and outdoors. The technical field relating to cameras is undergoing continuous development and improvement which have led to, for example, larger image resolutions, improved optics, and new functionalities.

A larger image resolution is obtained by a large image sensor with an increased number of pixels. However, a camera with such an image sensor is also more sensitive to misalignment between the image sensor and the optics unit which provides the image sensor with light representing the scene to be monitored. That is, a higher pixel intensity in the image sensor yields that a misalignment between the optics unit and the sensor board has a larger impact on the resulting image quality. It is thus increasingly important to ensure a precise alignment between the optics unit and the image sensor.

A commonly used alignment technique for camera manufacturing today is active alignment. Here, a sensor board, comprising an image sensor, and an optics unit are adjusted in relation to each other based on images captured during the alignment in order to optimize quality characteristics (such as focus and centering of the light axis on the image sensor) of the resulting image. In many active alignment techniques UV curing glue is used to fix the image sensor to the optics unit. The UV curing glue is applied between the image sensor and the optics unit. Thereafter, the alignment, (i.e. positioning of the image sensor and the optics unit relative each other), is performed. Finally, when the alignment is considered satisfactory, the glue is exposed to UV light whereby it solidifies and fixes the positions of the image sensor and optics unit relative each other. However, the use of UV curing glue has a number of drawbacks including the need for storing the glue, the need for application of the glue which makes the process complex, outgassing, and that the curing of the glue is permanent and thus cannot be reversed. Also, application of UV light may require specific knowledge in order to ensure correct hardening, for example regarding wave length of the UV light, intensity output, curing time, curing depth, etc. Further, in known active alignment processes, such as the one using UV curing glue, dust may enter the area between the image sensor and the optics unit and give rise to image deteriorations. At least a part of the mounting process, including the active alignment process, must therefore be performed in a clean environment, for example in a clean room adapted for the process.

Evidently, there is a strong need for improvements relating to alignment between an optics unit and a sensor board in a camera arrangement.

SUMMARY

It is a general object of the disclosure to improve known alignment processes by replacing the need for using a glue or similar component. A specific object of the disclosure is to provide an alignment member that improves the alignment process in view of at least some of the drawbacks mentioned above. A further object is to provide a method for alignment using such an alignment member. Yet another object of the disclosure is to provide an alignment member that enables re-alignment.

According to a first aspect, an alignment member for alignment of a sensor board relative an optics unit is provided. The alignment member is arranged to couple the sensor board to the optics unit. The alignment member comprises: a section formed by a thermoplastic material and arranged to support the sensor board; and a heating element which upon activation is arranged to transfer heat to the section such that the section at least partly is heated to a temperature being at least the glass transition temperature for the thermoplastic material for enabling alignment of the sensor board relative the optics unit when coupled to each other via the alignment member.

By thermoplastic material is, within the context of this application, meant a plastic material (a polymer) that becomes pliable or moldable above a specific temperature and solidifies upon cooling. A thermoplastic material is associated with a glass transition temperature and a melting temperature, which is always higher than the glass transition temperature. When the thermoplastic material is heated to a temperature being at least the glass transition temperature but below the melting temperature, the thermoplastic material is in a glassy state. In the glassy state, the thermoplastic material assumes a state that can be referred to as a viscous or a rubbery state in which the thermoplastic material is deformable without melting. The glass transition temperature may also be referred to as the softening temperature.

By that the section is at least partly heated to a temperature being at least the glass transition temperature, the thermoplastic material in the section is softened and assumes a glassy state such that the relative position between the sensor board and the optics unit may be adjusted by adjusting the position of the sensor board and/or the position of the optics unit. In other words, at least one of the sensor board and the optics unit may be moved by linear or tilt movement relative the other and in view of an optical axis of the camera arrangement. Thus, alignment of the sensor board relative the optics unit is enabled. When the heating element is deactivated, whereby heat is no longer transferred from the heating element to the section, the section may cool to a temperature below the glass transition temperature and the thermoplastic material thereof thus solidifies. Thereby, the relative position between the sensor board and the optics unit is again fixed and cannot be adjusted.

One advantage with the disclosed alignment member is that it provides the possibility of re-alignment. By use of a thermoplastic material in the section, the section can be repeatedly heated above the glass transition temperature and cooled below that temperature. Alignment of the sensor board relative the optics unit may thus be performed multiple times by activating and de-activating the heating element of the alignment member. This is an advantage in view of known techniques using for example glue where the hardening cannot be reversed once the glue has been cured. By use of the disclosed alignment member, alignment may be performed not only during mounting of a camera assembly but also when the equipment is installed and when in use. Thus, re-alignment may be performed at the installation site for adjustment in view of, for example, site-specific conditions.

Another advantage with the disclosed alignment member is that the mounting of the camera arrangement, including alignment of the sensor board, can be performed in a simpler manner. Specifically, prior art camera arrangements typically need to be mounted, including the alignment of the optics unit and the sensor board relative each other, in a clean room in order to avoid that dust enters the area between the image sensor (of the sensor board) and the optics unit. This is the case when using for example UV glue. In that case, mounting process steps such as the application of the glue, the (active) alignment process, and curing the glue for fixing the positions of the optics unit and the sensor board relative each other, need to be performed in a clean room.

The disclosed approach, however, may enable a simpler mounting process in that fewer steps of the mounting process need to be performed in a clean room. This is in particular the case when the alignment member is arranged such that a sealed space is provided between the alignment member and the sensor board when the alignment member is attached thereto. A clean room environment is then required during attachment of the alignment member to the sensor board, however the subsequent alignment procedure does not require any clean environment since the image sensor is located in, and thus protected by, the sealed space. Consequently, the clean room need not be adapted for the alignment process that typically requires lots of space and involves external equipment (that also need to be clean). Hence, the disclosed concept enables a potentially less complex and less costly mounting process.

Another advantage with the disclosed alignment member is that it enables a simple alignment/re-alignment procedure for the sensor board relative the optics unit. Once mounted, there are only a few parameters to control for the alignment/re-alignment procedure, for example current force and current duration when using a heating element in the form of a resistive heating element.

Yet another advantage with the disclosed alignment member is that it enables the use of materials in the sensor board and in the alignment member that cannot be used in prior art techniques such as attachment by UV glue. Some materials, such as liquid-crystal polymer (LCP), are not suitable for UV gluing. However, the disclosed alignment member is not dependent on any particular type of attachment technique between the alignment member and the sensor board. The attachment can be chosen to suit a material that is desired to use, instead of the other way around.

The heating element may be at least partly embedded in the alignment member. Alternatively, the heating element may be arranged on an outer surface of the section of the alignment member.

In one embodiment, the section forms a flange of the alignment member. The flange may be arranged to abut the sensor board. The flange may define an aperture for transmitting light from the optics unit to the sensor board.

The alignment member may be arranged to support the sensor board by being attached to a part of the sensor board. Various attachment techniques may be used. Non-limiting examples of attachment arrangements/techniques are glue, nail(s), screw(s), snap connection(s), tape, heat staking, and soldering.

In one embodiment, the heating element comprises a resistive heating element. The resistive heating element may comprise an electrically conductive thread, for example a resistor wire, being arranged in the section. The resistive heating element is arranged to be activated by providing a current through the resistive heating element. An advantage with using a resistive heating element is that the heat generated and transferred to the section locally, (i.e. nearby the section, minimizes, or at least reduces), the heating impact on the image sensor of the sensor board. Parts of a camera arrangement (comprising the sensor board, the alignment member, and the optics unit) may be sensitive to heat. For example, optical elements may be degraded when heated or portions made of a material sensitive for heating (such as a thermoplastic material) may be deformed in an undesired manner when exposed to high temperatures.

The image sensor may be sensitive for heating, in particular while operating, and it is therefore desirable to avoid exposing the image sensor to unnecessary heat.

In one embodiment, the heating element comprises an inductive heating element. The inductive heating element is arranged to be activated by being exposed to a magnetic field. An advantage provided with inductive heating elements is that the alignment member may be formed in a low-cost manner and without the need for providing any external connection.

The alignment member may comprise a plurality of heating elements.

The entire alignment member may be formed by the thermoplastic material. Such an embodiment may facilitate the manufacturing process.

The thermoplastic material may be an amorphous polymer or a liquid-crystal polymer (LCP). An advantage with LCP is that is has low thermal expansion which is suitable for the application. As mentioned above, LCP is a material that can be used as a thermoplastic material in the disclosed alignment member, but is not suitable for use in prior art techniques such as UV gluing.

The thermoplastic material may be chosen from the group of: Acrylonitrile butadiene styrene, Poly(methyl methacrylate), polystyrene, and polycarbonate (PC). PC is an advantageous material since it has a relatively low expansion when it is heated.

In one embodiment, the alignment member is plate shaped and arranged to be located between the optics unit and the sensor board. Such a configuration may contribute to a compact resulting configuration.

According to a second aspect, a camera arrangement is provided. The camera arrangement comprises an optics unit, a sensor board, and an alignment member. The sensor board is coupled to the optics unit via the alignment member. The alignment member comprises a section formed by a thermoplastic material and arranged to support the sensor board, and a heating element which upon activation is arranged to transfer heat to the section such that the section at least partly is heated to a temperature being at least the glass transition temperature of the thermoplastic material for enabling alignment of the sensor board relative the optics unit.

The above disclosed embodiments and advantages are applicable to the second aspect as well. To avoid undue repetition, reference is made to the above.

According to a third aspect, a method for aligning a sensor board being coupled to an optics unit via an alignment member is provided, wherein the alignment member comprises a section formed by a thermoplastic material and arranged to support the sensor board. The method comprises: activating a heating element comprised in the alignment member such that heat is transferred to the section for heating at least a part of the section to a temperature being at least the glass transition temperature for the thermoplastic material; aligning the sensor board relative the optics unit;

and de-activating the heating element for allowing the section to cool to a temperature below the glass transition temperature.

The operation of activating the heating element may comprise providing a current through a resistive heating element or applying a magnetic field to an inductive heating element.

The method may further comprise cooling the section. By cooling in this context is meant an active cooling of the section. The active cooling may accelerate the cooling process such that the section of the alignment member solidifies faster.

The heating element may be activated such that heat is transferred to the section for heating at least a part of the section to a temperature between the glass transition temperature and the melting temperature of the thermoplastic material. By providing such a configuration, an optimal softening of the thermoplastic material in the section is provided for the adjustment of the sensor board in relation to the optics unit.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

A more detailed understanding may be had from the following description, given by way of example in conjunction with the accompanying drawings where:

FIG. 1 illustrates an embodiment of a camera arrangement;

FIG. 2 illustrates an alignment member being attached to an image sensor;

Figure 3:
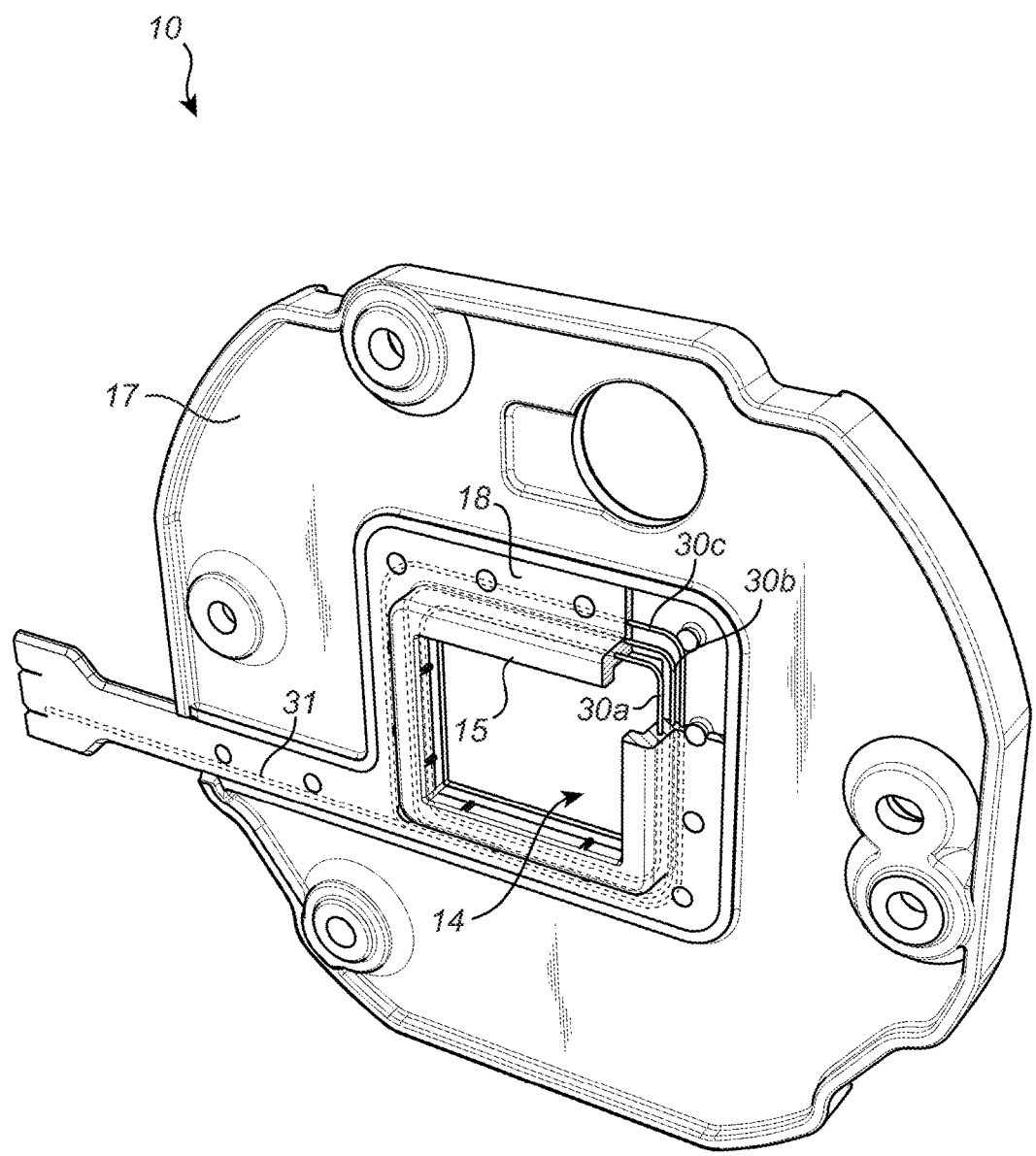
FIGS. 3, 4*a*, and 4*b* illustrate different embodiments of an alignment member.

As illustrated in the FIGS. 1-6, the figures are not necessarily to scale for purposes of clarity and, thus, are provided to illustrate the general structures of the embodiments.

DETAILED DESCRIPTION

FIG. 1 provides an overview of a camera arrangement 1 comprising an optics unit 11 and a sensor board 12. The camera arrangement 1 further comprises an alignment member 10. The alignment member 10 is in this embodiment arranged between the optics unit 11 and the sensor board 12, which contributes to a compact arrangement.

The alignment member 10 is attached to the optics unit 11 via screws 16. The alignment member 10 and the optics unit 11 are attached to each other such that their relative position is fixed. Alternative attachment configurations between the alignment member 10 and the optics unit 11 are possible and available to the skilled person without the need for further details herein. As an alternative to the alignment member 10 being a separate member, the alignment member 10 may form an integral part of the optics unit 11.

The alignment member 10 is in this embodiment formed by two parts: a base section 17 and an alignment section 18. During manufacturing of the alignment member 10, the alignment section 18 and the base section 17 are attached to each other so as to form a common part. Alternatively, the base section 17 and the alignment section 18 may be integrally formed. The base section 17 and the alignment section 18 may be formed by different materials or by the same type of material. Specifically, both the base section 17 and the alignment section 18 may be formed by a thermoplastic material which may be the same for both sections. Such an embodiment may facilitate the manufacturing process of the alignment member 10.

The alignment member 10 has an overall plate shaped form. An aperture 14 is provided in the alignment section 18. The alignment section 18 comprises a flange 15 that defines the aperture 14. The alignment section 18 is arranged to support the sensor board 12. Specifically, the flange 15 of the alignment section 18 is arranged to abut and attach to or be attached to the sensor board 12 for providing a supporting function. By that the alignment member 10 is fixed in position relative the optics unit 11 and is arranged to support the sensor board 12, the alignment member 10 couples the sensor board 12 to the optics unit 11. It is appreciated that the section of the alignment member 10 arranged to support the sensor board 12, above exemplified as the alignment section 18, may be constructed differently than in the embodiments described herein. Such modifications are possible to achieve for the skilled person without the need for providing further details herein. Moreover, the alignment member 10 may have different constructions depending on the application.

The supporting connection between the alignment member 10 and the sensor board 12 is illustrated in more detail in FIG. 2. Here, an image sensor 21 of the sensor board 12 is visible. The flange 15 of the alignment section 18 is glued to the sensor board 12 for providing a supporting connection therebetween. Other configurations of the supporting connection between the alignment member 10 and the sensor board 12 are achievable for the skilled person. For example, the alignment member 10 may be attached directly to a circuit member 22 of the sensor board 12. The attachment between the alignment member 10 and the sensor board 12 may be achieved by use of, for example, glue, nail(s), screw(s), snap connection(s), tape, heat staking, or soldering (when using for example LCP or PC as thermoplastic material). A snap connection may be achieved by, for example, arranging one or more snap elements on the alignment member 10 which are adapted to be fitted in corresponding one or more snap sockets arranged on the sensor board 12.

As seen in FIGS. 1 and 2, the alignment member 10 is arranged such that the aperture 14 is positioned in line with a light aperture 13 of the optics unit 11. Thus, light transmitted through the light aperture 13, which light represents an image acquired by the optics unit 11, may travel through the aperture 14 of the alignment member 10 and reach the image sensor 21 of the sensor board 12. The light is transmitted along an optical axis of the camera arrangement 1.

Going more into detail, embodiments of the construction of the alignment member 10 will now be described with further reference to FIGS. 3, 4*a*, and 4*b*. Common for the alignment members 10 in these embodiments is that each alignment member 10 comprises a section that is arranged to support the sensor board. The section is made from a thermoplastic material. Each alignment member 10 further comprises at least one heating element which is arranged to transfer heat to the section. Specifically, the heating element is arranged to transfer heat when the heating element is activated. The alignment member 10 with the heating element is arranged such that the section that is heated is at least partly heated to a temperature being at least the glass transition temperature for the thermoplastic material. Thereby, the thermoplastic material in the section is softened such that the relative position between the sensor board 12 and the optics unit 11 may be adjusted by adjusting the position of the sensor board 12 and/or the position of the optics unit 11. In other words, at least one of the sensor board 12 and the optics unit 11 may be moved by linear or tilt movement relative the other and in view of the optical axis of the camera arrangement 1. Thus, the position of the sensor board 12 may be aligned relative the position of the optics unit 11.

When the heating element is deactivated, whereby heat is no longer transferred to the section, the section may cool to a temperature below the glass transition temperature and the thermoplastic material solidifies. Thereby, the relative position between the sensor board 12 and the optics unit 11 is again fixed and cannot be adjusted.

The thermoplastic material may be chosen from the group of: Acrylonitrile butadiene styrene, Poly(methyl methacrylate), polystyrene, polycarbonate (PC), and liquid-crystal polymers (LCPs). PC is an advantageous material since it has relatively low expansion when it is heated. LCP is a well-known generic name for a specific class of polymers.

Starting with FIG. 3, a first embodiment of the alignment member 10 is illustrated. The alignment member 10 comprises a base section 17 and an alignment section 18, which have been described above. The alignment member 10 comprises resistive heating elements in the form of electrically conductive heating threads 30a, 30b, 30c that are embedded in the alignment member 10. Specifically, the heating threads 30a, 30b, 30c are arranged in the alignment section 18 that represents the section of the alignment member 10 that is referred to above. The heating threads 30a, 30b, 30c, or heating filaments, are connected to a conductive connection cable 31 that may also be embedded in the alignment section 18. The connection cable 31 is arranged to provide a conductive connection to and from each of the heating threads 30a, 30b, 30c such that a closed circuit is provided. The connection cable 31 is arranged to connect to an external power source.

It is appreciated that the heating threads 30a, 30b, 30c and the connection cable 31 may be formed by a single thread that is arranged to run one or more turns, three turns in the illustrated embodiment, around the aperture 14. Other variations of arrangement of the heating elements are also possible and are appreciated by the skilled person without further details provided herein.

The heating arrangement, comprising heating elements in the form of the heating threads 30a, 30b, 30c and the connection cable 31, is configured such that an electrical current may be provided through each of the heating threads 30a, 30b, 30c. The heating threads 30a, 30b, 30c are arranged to produce heat when activated, that is when an electrical current is provided therethrough. Non-limiting examples of heating threads 30a, 30b, 30c are resistance heating wires comprising, for example, Kanthal, wolfram (tungsten) or carbon. By resistance heating wire is meant a resistance wire (also known as resistor wire) that is arranged to generate heat from electric current. Resistance heating wires covers a wide range of different types of wires which are all well known to the skilled person. It is appreciated that other types of heating elements that generate heat may be used.

The heat is transmitted to and spread in at least a part of the surrounding material in the section, (i.e., in the alignment section 18). The temperature in the section thereby increases. The heating characteristics may be configured by, for example, the choice of heating threads, the level of current, and/or the activation time (i.e., how long time the current is provided through the heating threads 30a, 30b, 30c), such that the section is at least partly heated to a temperature being at least the glass transition temperature for the thermoplastic material of the section for achieving the above disclosed effect of alignment of the sensor board 12 in relation to the optics unit 11. The desired effect may be achieved by use of only one resistive heating element, although three resistive heating elements are used as an example for this embodiment.

The conductive heating threads 30a, 30b, 30c and the connection cable 31 may be arranged in the alignment member 10 by molding the alignment section 18, arranging the heating threads 30a, 30b, 30c and the connecting cable 31 therein, and thereafter add the base section 17 by over-molding. The alignment member 10 may of course be manufactured through other manufacturing processes and/or techniques.

Figure 4A:
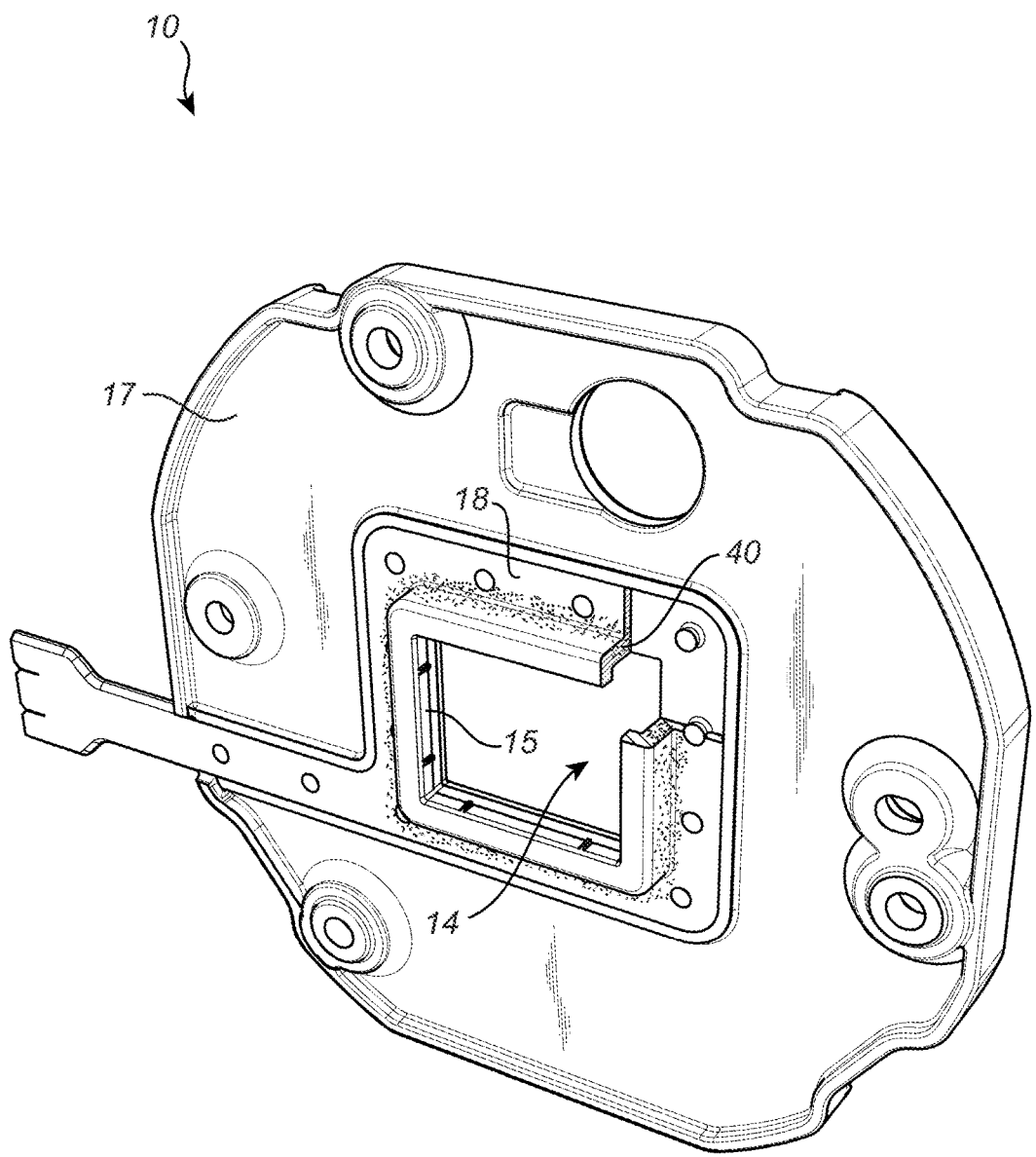

A second embodiment of the alignment member 10 is illustrated in FIG. 4a. Here, an inductive heating element is provided in the form of embedded metal filings 40. The metal may for example be iron. The metal filings 40 are provided in a section of the alignment section 18 in which the flange 15 meets a back plate of the alignment member 18. The section, in which the metal filings 40 are provided, forms the section that is to be at least partly heated. The inductive heating element, (i.e., the metal filings 40 in this embodiment), is activated by being exposed to a magnetic field. The magnetic field may be applied by use of an externally provided electromagnetic inductor comprising an electromagnet and an electronic oscillator. An altering magnetic field is applied to the inductive heating element, in this embodiment the metal filings 40, which thereby generate heat that transmits to and spreads in the section. The inductive heating arrangement, comprising the inductive heating element and the electromagnetic inductor, may be configured in various ways depending on the desired effect. Different such configurations can be achieved by the skilled person and will therefore not be described in detail here.

Figure 4B:
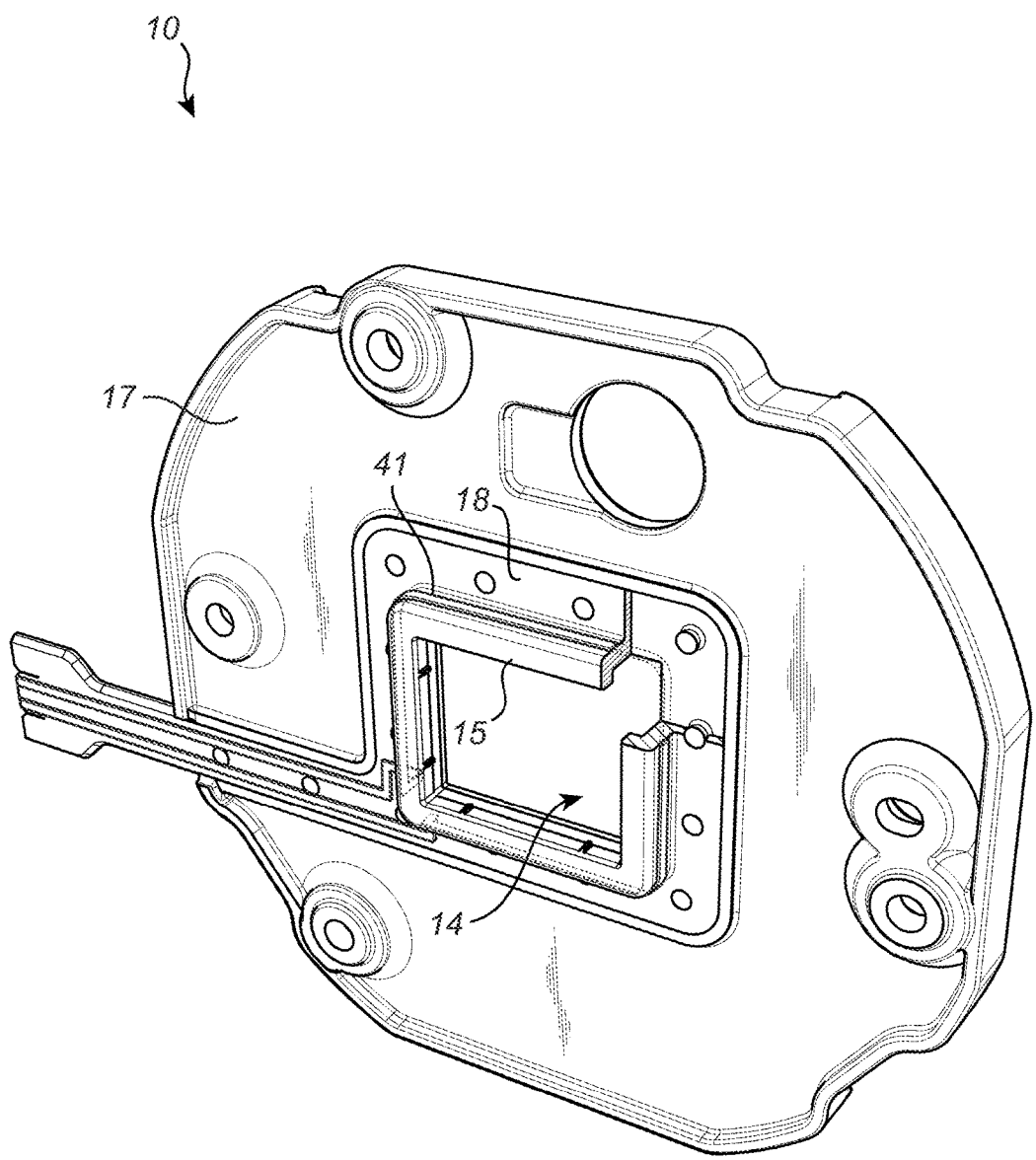

Yet another embodiment of the alignment member 10 is illustrated in FIG. 4b. A resistive heating element is provided in the form of a conductive strip 41. The conductive strip 41 may be printed on a surface of the alignment section 18. The conductive strip 41 is arranged along an outer surface of the flange 15 and along a part of the alignment section 18. The conductive strip 41 may be arranged to connect to an external power source. The conductive strip 41 is arranged to be activated by providing a current therethrough, whereby heat is developed in the conductive strip 41 and transmitted to at least a part of the alignment section 18. The alignment section 18 forms the section that is to be (at least partly) heated in this embodiment. This embodiment is an example of an alignment member 10 in which the heating element is arranged on an outer surface of the section. An advantage with having the heating element arranged on an outer surface, contrary to being embedded, is that outgassing, during for example the activation period of the heating element, may be restricted or at least reduced.

Figure 5:
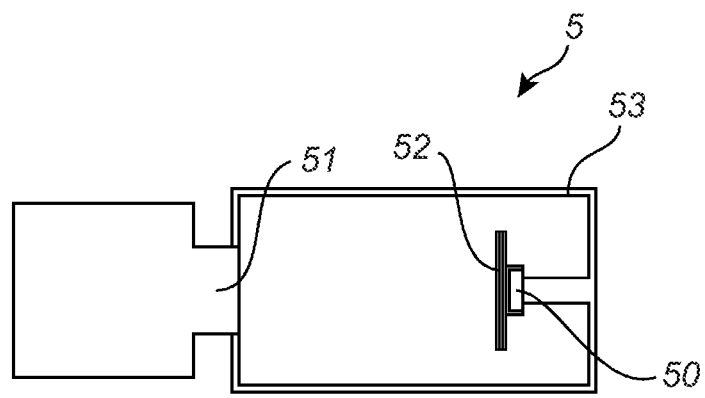
FIG. 5 illustrates another embodiment of a camera arrangement.

An alternative configuration of a camera arrangement 5 according to an embodiment is illustrated in FIG. 5. The camera arrangement 5 comprises a sensor board 52, an optics unit 51, and an alignment member 50. The sensor board 52 is coupled to the optics unit 51 via the alignment member 50. The alignment member 50 is located behind the sensor board 52 as seen from the optics unit 51. The alignment member 50 comprises, as disclosed in previous embodiments, a section formed by a thermoplastic material that is arranged to support the sensor board 52.

The alignment member 50 is attached to a coupling structure 53 that in turn is attached to the optics unit 51. Thus, a coupling between the sensor board 52 and the optics unit 51, via the alignment member 50, is achieved. The coupling between the sensor board 52 and the optics unit 51 via the alignment member 50 provides the same features as disclosed for previous embodiments, that is enabling alignment of the sensor board 52 relative the optics unit 51. The alignment is enabled by that the alignment member 50 comprises a heating element which upon activation is arranged to transfer heat to a section of the alignment member 50 such that the section is at least partly heated to a temperature being at least the glass transition temperature of the thermoplastic material of the section. The alignment member 50 may be constructed in various ways similar to what has been disclosed in above disclosed embodiments. For example, the alignment member 50 may comprise a resistive heating element or an inductive heating element.

Figure 6:
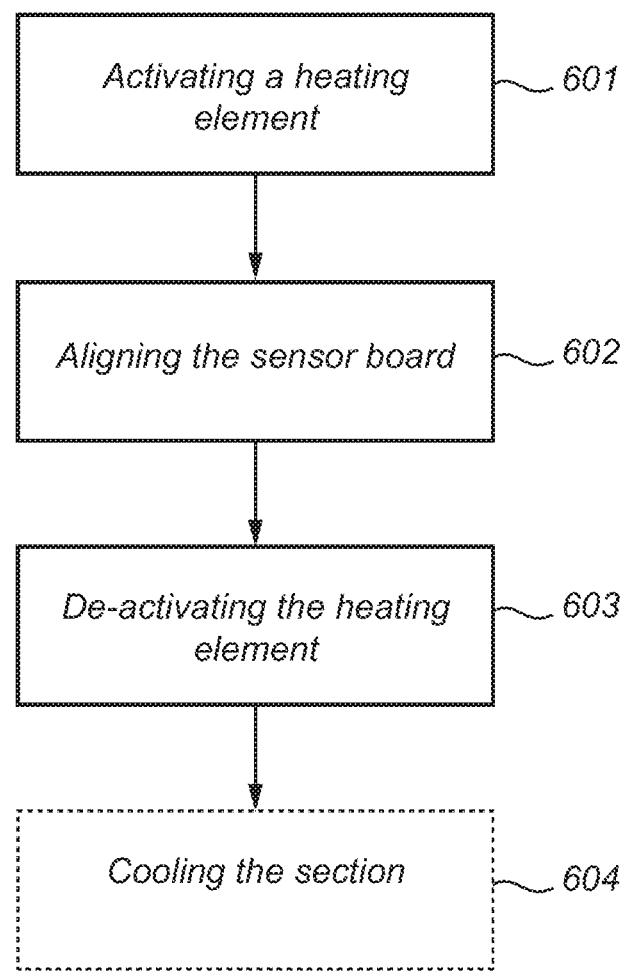
FIG. 6 illustrates a method for aligning a sensor board.

FIG. 6 illustrates a method for aligning a sensor board relative an optics unit. The sensor board is coupled to the optics unit via an alignment member which comprises a section formed by a thermoplastic material. The section may for example be formed by an alignment section as exemplified in above disclosed embodiments. The alignment member is arranged to support the sensor board. The alignment member may for example be constructed according to any of the above disclosed embodiments.

The method comprises activating 601 a heating element. The heating element is part of the alignment member. By the activation, heat is generated in the heating element and transferred to the section such that at least a part of the section is heated to a temperature being at least the glass transition temperature for the thermoplastic material. The activation is configured such that this effect is achieved. For example, a resistive heating element or an inductive heating element may be utilized. For a resistive heating element, the activation comprises providing a current through the resistive heating element. For an inductive heating element, the activation comprises applying a magnetic field to the inductive heating element. Detailed examples of such configurations have been disclosed above.

The method further comprises aligning 602 the sensor board. The alignment comprises adjusting the relative position between the sensor board and the optics unit for optimizing the captured image. The adjustment may be performed by adjusting the sensor board and/or the optics unit. The alignment may be performed as an active alignment, where the sensor board and the optics unit are adjusted in relation to each other based on images captured during the alignment for optimizing quality characteristics (such as focus and centering of the light axis on the image sensor) of the resulting image.

The method further comprises de-activating 603 the heating element of the alignment member. Thus, no more heat is generated by the heating element and the section of the alignment member is allowed to cool to a temperature below the glass transition temperature. The thermoplastic material of the section thus solidifies which disables position adjustment of the sensor board and the optics unit. Thereby alignment of the sensor board relative the optics unit is disabled.

The method may further comprise cooling 604 the section. By cooling is in this context meant an active cooling of the section. It is noted that if the room temperature is below the glass transition temperature, a natural cooling will, with or without active cooling, take place when the heating element is de-activated. The active cooling may accelerate the cooling process such that the section of the alignment member solidifies faster. The active cooling may comprise exposing the alignment member, in particular the section of the alignment member, for a flow of air having a lower temperature than the section. For a room of normal temperature (15-30 degrees Celsius) it may suffice to apply a flow of room air to the section. The flow of air may be applied by means of, for example, a conventional fan. Other cooling configurations of various types may be used depending on the desired cooling effect.

The method may comprise a further step of re-activating the heating element. Thus, the sensor board may be aligned more than once, (i.e. re-aligned), relative the optics unit. An advantage with the disclosed alignment member is that it enables this possibility of re-alignment. Specifically, by use of a thermoplastic material in the section, the section can be repeatedly (at least partly) heated above the glass transition temperature and cooled below that temperature. Alignment of the sensor board relative the optics unit may thus be performed multiple times by activating and de-activating the heating element of the alignment member. The heating element may be activated and de-activated a plurality of times and thus alignment of the sensor board relative the optics unit may be performed a plurality of times. This is an advantage in view of known techniques using for example glue where the hardening cannot be reversed once the glue has been cured. By use of the disclosed alignment member, alignment may be performed not only during mounting of a camera assembly but also when the equipment is installed and in use. Thus, re-alignment may be performed at the installation site for adjustment in view of, for example, site-specific conditions.

The process according to the alignment method may be configured differently depending on the desired effects and the configuration of, for example, the alignment member and its heating element or elements.

An example of how the alignment method may be configured will now be provided. In this example, the section of the alignment member comprises a section made of a thermoplastic material having a glass transition temperature of about 150 degrees Celsius. An example of such a thermoplastic material is polycarbonate (PC). The alignment member has a configuration according to the embodiment illustrated in FIG. 3, i.e. with embedded resistive heating elements. The heating elements are formed by a Kanthal heating resistance wire with a dimension of 0.2 mm in diameter. The method comprises: activation 601 by providing a current of about 1.4-1.5 A through the heating elements for 5-10 seconds; alignment 602 of the sensor board relative the optics unit; and de-activation 603 and cooling 604 by directed a flow of room air towards the section for 5-10 seconds.

The alignment method may further be configured so that the heating element is activated such that heat is transferred to the section for heating at least a part of the section to a temperature between the glass transition temperature and the melting temperature of the thermoplastic material. The exact configuration for achieving this function may be different depending on the design of the alignment member. Different combinations of parameters, such as the type of heating element, heating parameters, and type of thermoplastic material, may be applied in order to achieve different characteristics of the alignment method. For example, for an alignment member comprising a resistive heating element, the configuration may include applying a current of a predetermined value for a predetermined time in order to achieve that at least a part of the section is heated to the desired temperature interval, i.e. at least the glass transition temperature but not above the melting temperature. Other alternative configurations may be determined by the skilled person without the need for further details herein. By providing a configuration where the section of the alignment member is at least partly heated to a temperature in the above interval, an optimal softening of the thermoplastic material in the section is provided for the adjustment of the sensor board in relation to the optics unit.

The person skilled in the art realizes that the disclosed teachings are by no means is limited to the embodiments described above. On the contrary, many modifications and variations are possible within the scope of the appended claims For example, other types of heating elements than the ones exemplified above may be utilized in order to achieve a heating of the section such that at least a part of the section reaches the glass transition temperature. Moreover, other thermoplastic materials than the ones exemplified above may be used for achieving the desired characteristics.

What is claimed is:

1. An alignment member for alignment of a sensor board relative an optics unit, the alignment member being arranged to couple the sensor board to the optics unit, the alignment member comprising:
    a section formed by a thermoplastic material and arranged to support the sensor board; and
    a heating element which upon activation is arranged to transfer heat to the section such that the section at least partly is heated to a temperature being at least the glass transition temperature for the thermoplastic material for enabling alignment of the sensor board relative the optics unit when coupled to each other via the alignment member.

2. The alignment member according to claim 1, wherein the heating element is at least partly embedded in the alignment member.

3. The alignment member according to claim 1, wherein the heating element is arranged on a surface of the alignment member.

4. The alignment member according to claim 1, wherein the section forms a flange that is arranged to abut the sensor board and that defines an aperture for transmitting light from the optics unit to an image sensor of the sensor board.

5. The alignment member according to claim 1, wherein the heating element is a resistive heating element.

6. The alignment member according to claim 5, wherein the resistive heating element comprises an electrically conductive thread being arranged in the section.

7. The alignment member according to claim 1, wherein the heating element is an inductive heating element.

8. The alignment member according to claim 1, wherein the entire alignment member is formed by the thermoplastic material.

9. The alignment member according to claim 1, wherein the thermoplastic material is an amorphous polymer or a liquid-crystal polymer.

10. The alignment member according to claim 1, wherein the alignment member is plate shaped and arranged to be located between the optics unit and the sensor board.

11. A camera arrangement comprising:
    an optics unit;
    a sensor board; and
    an alignment member, wherein the sensor board is coupled to the optics unit via the alignment member; and
    wherein the alignment member comprises:
        a section formed by a thermoplastic material and arranged to support the sensor board; and
        a heating element which upon activation is arranged to transfer heat to the section such that the section at least partly is heated to a temperature being at least the glass transition temperature of the thermoplastic material for enabling alignment of the sensor board relative the optics unit.

12. A method for aligning a sensor board being coupled to an optics unit via an alignment member, the alignment member comprising a section formed by a thermoplastic material and being arranged to support the sensor board, the method comprising:
    activating a heating element comprised in the alignment member such that heat is transferred to the section for heating at least a part of the section to a temperature being at least the glass transition temperature for the thermoplastic material;
    aligning the sensor board relative the optics unit; and
    de-activating the heating element for allowing the section to cool to a temperature below the glass transition temperature.

13. The method according to claim 12, wherein the operation of activating the heating element comprises providing a current through a resistive heating element or applying a magnetic field to an inductive heating element.

14. The method according to claim 12, further comprising cooling the section.

15. The method according to claim 12, wherein the heating element is activated such that heat is transferred to the section for heating at least a part of the section to a temperature between the glass transition temperature and the melting temperature of the thermoplastic material.

* * * * *